(12) United States Patent
Heinebrodt et al.

(10) Patent No.: US 7,831,897 B2
(45) Date of Patent: Nov. 9, 2010

(54) DATA TRANSMISSION PATH INCLUDING A DEVICE FOR CHECKING THE DATA INTEGRITY

(75) Inventors: Martin Heinebrodt, Stuttgart (DE); Ulf Wilhelm, Rutesheim (DE); Paco Haffmans, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 862 days.

(21) Appl. No.: 10/572,697

(22) PCT Filed: Aug. 10, 2004

(86) PCT No.: PCT/DE2004/001796

§ 371 (c)(1),
(2), (4) Date: Apr. 26, 2007

(87) PCT Pub. No.: WO2005/032033

PCT Pub. Date: Apr. 7, 2005

(65) Prior Publication Data
US 2007/0230464 A1    Oct. 4, 2007

(30) Foreign Application Priority Data
Sep. 18, 2003   (DE) ................... 103 43 172

(51) Int. Cl.
*H03M 13/00* (2006.01)
(52) U.S. Cl. ........................ 714/821
(58) Field of Classification Search .................. 714/821
See application file for complete search history.

(56) References Cited

U.S. PATENT DOCUMENTS

| | | | |
|---|---|---|---|
| 4,700,020 A * | 10/1987 | Michels-Krohn et al. ... | 178/2 R |
| 4,852,680 A * | 8/1989 | Brown et al. ................ | 180/287 |
| 5,341,430 A * | 8/1994 | Aulia et al. .................. | 370/389 |
| 5,499,247 A | 3/1996 | Matsuda et al. | |
| 6,026,074 A * | 2/2000 | Stadler et al. .......... | 370/395.62 |
| 6,118,729 A * | 9/2000 | Hirabayashi et al. ... | 365/233.13 |
| 6,470,012 B2 * | 10/2002 | Nakatsugawa .............. | 370/392 |
| 6,515,930 B2 * | 2/2003 | Jacquet et al. .............. | 365/222 |
| 6,683,854 B1 * | 1/2004 | Blanc et al. ................. | 370/241 |
| 2002/0071552 A1* | 6/2002 | Rogaway ..................... | 380/37 |
| 2006/0273878 A1* | 12/2006 | Michmerhuizen et al. .. | 340/5.72 |

FOREIGN PATENT DOCUMENTS

| | | |
|---|---|---|
| DE | 69230738 | 11/2000 |
| EP | 0511744 | 11/1992 |
| EP | 0 890 937 | 1/1999 |

(Continued)

*Primary Examiner*—Scott T Baderman
*Assistant Examiner*—Enam Ahmed
(74) *Attorney, Agent, or Firm*—Kenyon & Kenyon LLP

(57) ABSTRACT

Described is a data transmission path including a device for checking the data integrity of data transmitted from the sender side to the receiver side of the data transmission path, in a motor vehicle in particular, having a first data modification device on the sender side and a second data modification device on the receiver side which each have the same transmission function and a comparator for comparing the output data of the data modification devices. Input data are modified into output data on the sender side and transmitted to the receiver side, and identical input data are transmitted to the receiver side and modified there into output data. Moreover, a method for checking the data integrity is described.

18 Claims, 1 Drawing Sheet

FOREIGN PATENT DOCUMENTS

| | | |
|---|---|---|
| EP | 0 998 160 | 5/2000 |
| JP | 5175971 | 7/1993 |
| JP | 5316125 | 11/1993 |
| JP | 7183887 | 7/1995 |
| JP | 2002247013 | 8/2002 |

\* cited by examiner

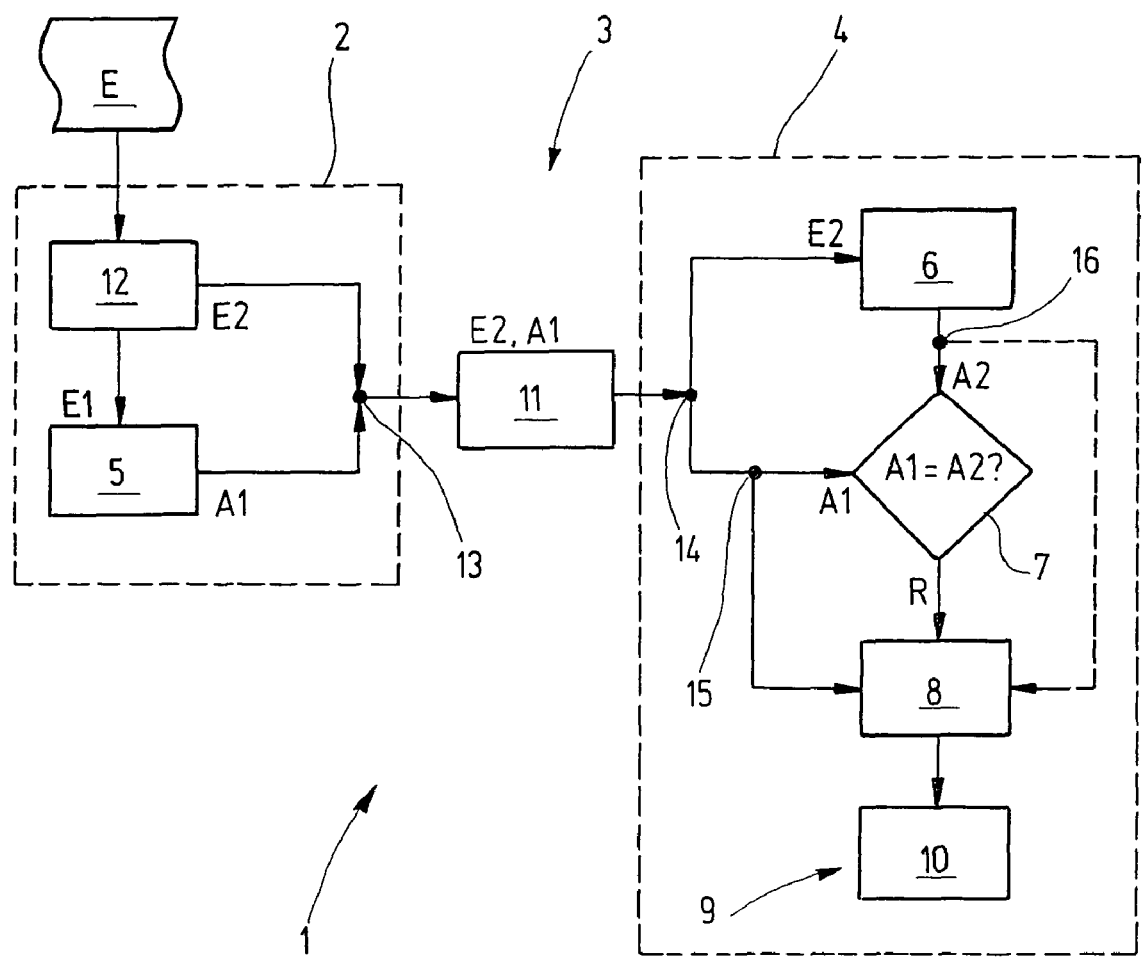

DATA TRANSMISSION PATH INCLUDING A DEVICE FOR CHECKING THE DATA INTEGRITY

FIELD OF THE INVENTION

The present invention relates to a data transmission path including a device for checking the data integrity of data transmitted from the sender side to the receiver side of the data transmission path, in a motor vehicle in particular, and to a method for checking the data integrity.

BACKGROUND INFORMATION

Data transmission paths of the generic type are known. They are used for the purpose of detecting whether data transmitted by a sender has reached the receiver in unmodified form. For this, check sum methods are known, for example, in which a check sum for the data to be transmitted is determined on the sender side and attached to the data to be transmitted. The check sum of the transmitted data is subsequently determined on the receiver side and compared to the attached transmitted check sum. If this check is positive, i.e., a correct transmission of the data from sender to receiver is detected, the integrity of the data is ensured and the data may be further processed on the receiver side. If the check shows a negative result, i.e., a modification of the data on the sender-receiver path has been detected, a procedure for correcting the transmission error is initiated.

In particular in safety-relevant and time-critical applications, e.g., when activating the brake system of a motor vehicle, the check of the data integrity must meet high demands. In addition to the manual request by the motor vehicle user, a brake request may also be triggered today by safety functions such as an anti-lock braking system, an electronic stability program, or a brake assistant, or by comfort functions such as an adaptive cruise control. The signals are transmitted in part by the CAN (Controller Area Network) vehicle communication network; additional control units, for the dashboard, the engine, or a diagnostic system, for example, may also be connected to the CAN. Since unauthorized actuation of a brake system, in particular the execution of automated full braking, presents a significant danger for the motor vehicle user and other road users, a brake may only be actuated when the control unit of the brake system has actually generated a brake request. Unauthorized brake requests may be caused, for example, by errors in control units connected to the CAN or by interferences within the CAN itself. An aggravating fact is that such applications are time-critical, i.e., the time period between the brake request by the control unit of the brake system and the required brake actuation is so small that no time remains for verifying the validity of the brake request, either through the control unit or the brake itself. In terms of time, it is frequently possible to transmit only a single actuation signal. No time remains for correcting an erroneous signal by another signal, or for awaiting another signal for a check. Therefore, a single signal takes on great importance with an irreversible character to a certain extent.

SUMMARY OF THE INVENTION

The data transmission path according to the present invention has the advantage over the related art that reliable detection of the data integrity is also implemented in time-critical applications. The data transmission path is characterized by a first data modification device on the sender side and a second data modification device on the receiver side, which each have the same transmission function causing the modification from input data into output data and are both connected to the data transmission path, a comparator on the receiver side which compares the output data supplied from the first data modification device via the data transmission path and the second data modification device and activates an enabling device when the output data match, the comparator being connected to the data transmission path and the second data modification device, the transmission of input data, generated on the sender side, to the first data modification device and of similar input data to the second data modification device via the data transmission path.

Such a data transmission path functions as follows. Input data, via which an event on the receiver side should be triggered, is initially generated on the sender side of the data transmission path. The data transmission path may be a closed-circuit connection path (e.g., electrical or optical), as well as a wireless connection path (e.g., radio or infrared transmission). Input data is initially transmitted to the first data modification device and, via the data transmission path, to the second data modification device. The input data which is transmitted to the first and the second data modification device is similar or identical. This may be achieved, for example, by generating two similar input data signals and supplying them to the first and the second data modification device, or also by splitting the signal of the input data, subsequent to its generation, into two similar but separate input data signals.

The data modification devices are designed as a logic circuit, a programmable electronic module, or a processor and have the same transmission function. It is important for the same transmission function that, when matching input data is supplied to the data modification devices, matching output data is also generated. However, it not necessary for the output data to be generated via identical individual steps. (It is possible, for example, to implement the "doubling of x" transmission function as "multiplication of 2·x" as well as "addition x+x"). The output data, generated by the data modification devices, is supplied to the comparator on the receiver side, with the output data, generated on the sender side, being transmitted to the receiver side via the data transmission path. The comparator checks the output data, generated on the sender side and on the receiver side, for identity. If a difference is detected, the output data is rejected and is no longer used. If the output data is identical, the comparator activates the enabling device which releases the output data from the sender side and from the receiver side for further processing. (Due to the identity of the sender-side and receiver-side output data, further use of the sender-side and receiver-side output data always has the same result.)

The described data transmission path offers great reliability in the detection of data integrity since two different data sets, related in a defined manner, are transmitted. In this way, coincidental errors in the data integrity as well as systematic errors may be detected since the selection of the transmission function, e.g., an unambiguous function having a great number of possible input data and output data, makes it possible to prevent input data and output data, modified along the transmission path, from resulting in matching output data at the comparator. Moreover, the described data transmission path has a speed advantage since the data modification devices operate independently of one another and the time windows, in which the data modification devices generate the output data, thus overlap or may even be simultaneous.

A particularly advantageous embodiment is provided when the input data is transmitted toward the first and the second data modification device essentially simultaneously. Since the run sequences "first data modification device, data transmission path, input of the comparator" and "data transmission path, second data modification device, input of the comparator" require approximately the same time, an essentially simultaneous sending of the input data also means an approximately simultaneous arrival of the output data at the comparator, thereby avoiding waiting periods at the comparator in which the comparator must wait for output data at one of its inputs. This makes it possible to minimize the time from generating the input data to detecting the data integrity.

In a further embodiment of the present invention, the data transmission path has at least one communication channel, in particular a CAN (Controller Area Network) communication channel. This represents a possibility for saving manufacturing costs due to the fact that parts of an already existing network are used for implementing the data transmission path.

The output data generated by the first data modification device and the input data supplied to the second data modification device is advantageously transmitted via a common communication channel of the data transmission path.

A further advantage is achieved when the enabling device enables the operation of an actuator, a brake in particular. This ensures that an actuator is not triggered based on erroneously transmitted data or based on data not intended for the actuator. In this way, a dangerous false actuation of the brake of a motor vehicle, in particular the false triggering of full braking, may be prevented.

In addition, the present invention relates to a method for checking the data integrity of data transmitted from the sender side to the receiver side of a data transmission path, in particular in a motor vehicle, whereby input data is modified into first output data by a first data modification device having a transmission function, the output data being supplied to a comparator via the data transmission path, the same input data is supplied to a second data modification device, having the same transmission function, via the data transmission path, modified into second output data, and supplied to the comparator, and in the event of the identity of the first and second output data, the comparator outputs an actuation signal.

BRIEF DESCRIPTION OF THE DRAWING

The FIGURE shows the operating mode in principle of a data transmission path according to the present invention having a device for checking the data integrity.

DETAILED DESCRIPTION

The FIGURE shows a data transmission path 1 having an area on the sender side 2, a data transmission path 3, and an area on the receiver side 4. A control device 12 and a first data modification device 5 are situated on sender side 2. Receiver side 4 has a second data modification device 6, a comparator 7, an enabling device 8, and an actuator 9 which is designed here as brake 10 of a motor vehicle. The data transmission path is designed here as communication channel 11 of a CAN on which data is transmitted serially. Receiver encoding within the data ensures that even during use of a common communication channel 11 or communication network, the data is always only accepted by the addressed target receiver. First and second data modification devices 5, 6 have the same transmission function via which input data is modified into output data. This means that data modification devices 5, 6 generate matching output data when they are supplied with matching input data. Data transmission path 1 functions as follows:

Based on processor or program instructions, control device 12 generates input data E1, E2 from source input data E which originates from sensors (not shown in detail). Input data E1 is modified into output data A1 by first data modification device 5 and supplied to a first input of comparator 7 via feed point 13, communication channel 11, and decoupling point 14. Input data E2 is supplied to second data modification device 6 via feed point 13, communication channel 11, and decoupling point 14; the second data modification device generates output data A2 and supplies it to the second input of comparator 7. Comparator 7 checks output data A1, A2 for identity and conveys the check result to enabling device 8 via line R. Only in the event of the identity of output data A1, A2, enabling device 8 is activated and transmits output data A1, which is branched off at node 15, to brake 10. The dashed line from node 16 to enabling device 8 indicates that output data A2 may also be used for transmission. If needed, output data A1 and A2 may also be supplied to enabling device 8, a logic within enabling device 8 determining which data shall be transmitted to brake 10.

In summary it may be ascertained that a signal transmission to brake 10 takes place only when output data A1, generated by first data modification device 5 and transmitted to comparator 7 via communication channel 11, corresponds to output data A2 which has been generated by second data modification device 6 based on input data E2 transmitted via communication channel 11. If a change in input data E2 takes place along communication channel 11, second data modification device 6 generates output data A2 which does not correspond to output data A1 and enabling device 8 is thus not activated. A change in output data A1 along communication channel 11 evokes an identical result because output data A2 also does not correspond to the changed output data A1. A change in input data E2 and output data A1 is also detected when the transmission function of first and second data modification devices 5, 6 has a great number of possible input data and output data. It is therefore ensured with a high degree of reliability that brake 10 is only actuated when it should be actuated according to source input data E.

In addition to the high degree of reliability provided by the data transmission path, minimal time is needed for checking the data integrity since first and second data modification devices 5, 6 operate independently of one another and are able to process input data E1, E2 as soon as this input data E1, E2 is available at the respective input of first or second data modification device 5, 6. As a result of output data A1, A2 is available to comparator 7 as quickly as possible, so that the data integrity may be checked immediately. Moreover, it is possible to deactivate enabling device 8 in order to abort a triggered brake operation by specifically generating a dissimilarity at the inputs of comparator 7. To achieve this, it is sufficient to change input data E1 or E2 or to effect a change of output data A1, A2 in one of data modification devices 5, 6.

What is claimed is:

1. A data transmission path arrangement, comprising:
   an enabling device;
   a device for checking a data integrity of data transmitted from a sender side to a receiver side of the data transmission path;
   a first data modification device located on the sender side;

a second data modification device located on the receiver side, the first data modification device and the second data modification device each have the same transmission function effecting a modification of input data into output data and are connected to the data transmission path; and a comparator located on the receiver side and connected to the data transmission path and the second data modification device;

wherein the comparator compares the output data supplied by the first data modification device and the second data modification device via the data transmission path, wherein the comparator activates the enabling device when the output data of the first data modification device and the second modification device are identical, and wherein a transmission of the input data, generated on the sender side, to the first data modification device and a transmission of identical input data to the second data modification device via the data transmission path occur on the data transmission path.

2. The data transmission path arrangement as recited in claim 1, wherein the input data are sent essentially simultaneously in a direction of the first and the second data modification devices.

3. The data transmission path arrangement as recited in claim 1, wherein the data transmission path includes at least one communication channel corresponding to a CAN (Controller Area Network) communication channel.

4. The data transmission path arrangement as recited in claim 3, wherein the output data generated by the first data modification device and the input data supplied to the second data modification device are transmitted via a common communication channel of the data transmission path.

5. The data transmission path arrangement as recited in claim 1, wherein the enabling device enables an operation of an actuator.

6. The data transmission path arrangement as recited in claim 5, wherein the actuator includes a brake.

7. A method for checking a data integrity of data transmitted from a sender side to a receiver side of a data transmission path, comprising:

modifying input data into first output data by a first data modification device, on the sender side, having a transmission function;

supplying the first output data to a comparator, located on the receiver side and connected to the data transmission path and the second data modification device, via the data transmission path;

supplying, via the data transmission path, the identical input data to a second data modification device, on the receiver side, having the same transmission function;

modifying the identical input data into second output data by the second data modification device;

supplying the second output data to the comparator, which compares the output data supplied by the first data modification device and the second data modification device via the data transmission path; and outputting by the comparator an activation signal when the first and the second output data are identical;

wherein a transmission of the input data, generated on the sender side, to the first data modification device and a transmission of identical input data to the second data modification device via the data transmission path occur on the data transmission path.

8. The method as recited in claim 7, wherein the data transmission path is in a motor vehicle.

9. The data transmission path arrangement as recited in claim 1, wherein the data transmission path is in a motor vehicle.

10. The data transmission path arrangement as recited in claim 1, wherein the data transmission path arrangement is a wireless connection path arrangement.

11. The data transmission path arrangement as recited in claim 1, wherein the input data is split into two similar but separate input data signals and transmitted to the first and the second data modification device accordingly.

12. The data transmission path arrangement as recited in claim 1, wherein the first data modification device and the second modification device generate matching output data when they are supplied with matching input data.

13. The data transmission path arrangement as recited in claim 1, wherein the input data are sent essentially simultaneously in a direction of the first and the second data modification devices, wherein the data transmission path includes at least one communication channel corresponding to a CAN (Controller Area Network) communication channel, wherein the output data generated by the first data modification device and the input data supplied to the second data modification device are transmitted via a common communication channel of the data transmission path.

14. The data transmission path arrangement as recited in claim 13, wherein the enabling device enables an operation of an actuator, and wherein the actuator includes a brake.

15. The data transmission path arrangement as recited in claim 13, wherein the data transmission path arrangement is a wireless connection path arrangement, wherein the input data is split into two similar but separate input data signals and transmitted to the first and the second data modification devices accordingly, and wherein the first data modification device and the second modification device generate matching output data when they are supplied with matching input data.

16. The data transmission path arrangement as recited in claim 15, wherein the enabling device enables an operation of an actuator, and wherein the actuator includes a brake.

17. The data transmission path arrangement as recited in claim 1, wherein the data transmission path arrangement is a wireless connection path arrangement, wherein the input data is split into two similar but separate input data signals and transmitted to the first and the second data modification devices accordingly, and wherein the first data modification device and the second modification device generate matching output data when they are supplied with matching input data.

18. The data transmission path arrangement as recited in claim 17, wherein the enabling device enables an operation of an actuator, and wherein the actuator includes a brake.

* * * * *